June 10, 1930.  F. F. PFEFFERKORN  1,762,417
PORTABLE FOOD SAFE
Filed April 28, 1928

Inventor
Frederick F. Pfefferkorn
By Brockett & Hyde
Attorneys

Patented June 10, 1930

1,762,417

UNITED STATES PATENT OFFICE

FREDERICK F. PFEFFERKORN, OF LAKEWOOD, OHIO, ASSIGNOR TO THE GEO. H. BOWMAN COMPANY, OF CLEVELAND, OHIO, A CORPORATION OF OHIO

PORTABLE FOOD SAFE

Application filed April 28, 1928. Serial No. 273,738.

This invention relates to improvements in what may be termed "portable food safes" of the type comprising a food supporting base member and a removable cover member therefor.

One object of the present invention is the provision of a food safe of the type described which is especially designed for cake, the base member of the safe having a central cake supporting portion lying in a plane above the outer marginal portion thereof, so that not only can the cake be easily and quickly cut without liability of damage to the knife but also, the knife can be readily inserted below the cake when it is desired to remove a part thereof.

A further object of the invention is the provision of a cake safe in which the cake supporting portion of the base member is surrounded by two annular grooves, the inner and larger groove being adapted to receive cake particles or crumbs and the outer groove being adapted to receive the lower edge of the skirt portion of the safe cover member.

A further object of the invention is the provision of a cake safe of the type described which is neat and pleasing in appearance and economical to manufacture.

Further objects of the invention are in part obvious and in part will appear more in detail hereinafter.

Figure 1:
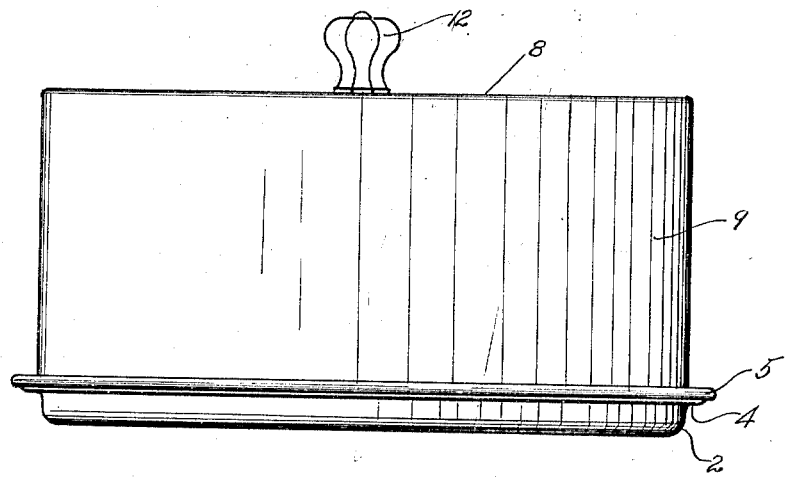
Figure 2:
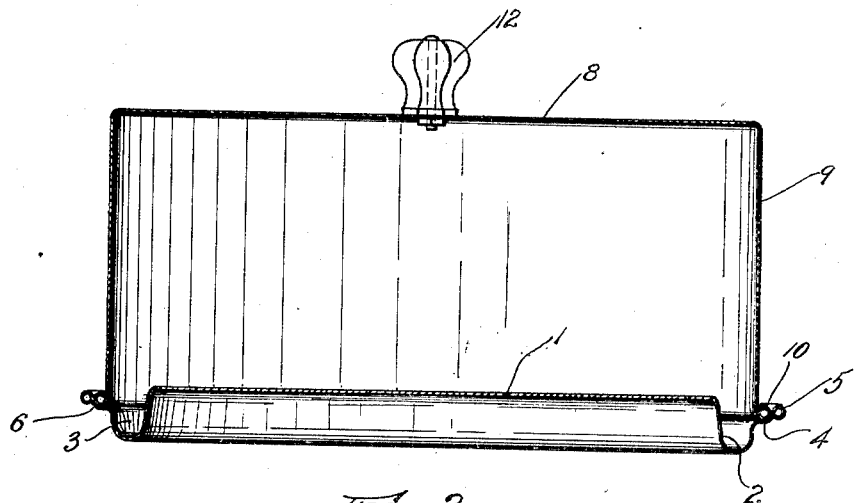

In the drawing, Fig. 1 is a side elevation of a cake safe embodying my invention; and Fig. 2 is a central vertical sectional view thereof.

The cake safe shown in the drawing comprises a base member and a cover member therefor, as is usual, said members being made of any suitable material, such as aluminum, and being of any suitable size and shape.

In the present embodiment of the invention, the base member is of circular shape and includes a central, cake supporting portion 1 also of circular shape. The outer edge of said portion merges into an annular U-shaped portion 2 forming a crumb receiving groove 3 and the outer wall of said U-shaped portion merges into an upwardly and outwardly extending portion 4 terminating in an annular bead 5. Said last named portion is provided with an annular groove or depression 6 to receive the cover member, as clearly shown in Fig. 2.

Said cover member includes a circular top portion 8 which merges into a depending cylindrical skirt portion 9 which terminates in an annular bead 10 adapted to seat within the outer groove 6 of the base member. A suitable knob or handle 12 is secured to the cover top portion 8, preferably at the center thereof, to enable the cover member to be readily handled, as will be understood.

As clearly indicated in Fig. 2, the plane of the upper surface of the cake receiving base portion 1 is above the marginal base portion 4. There is, therefore, no liability of damaging the knife blade while cutting the cake and said blade can be readily inserted beneath the cake when it is desired to remove a part thereof. The inner base groove 3 is of sufficient size to readily receive the cake crumbs so that they are not carried, either by the cover member or otherwise, to the support upon which the safe rests.

What I claim is:

A portable food safe of the character described, including, in combination, a base and a removable cover therefor, said cover comprising a top portion and a skirt portion depending from the outer edge thereof, said base comprising an inner article-supporting portion having a substantially flat article-supporting top surface; an outer cover-supporting portion curved outwardly and upwardly to provide a seating groove to receive the lower end of the skirt portion of said cover; and an intermediate crumb-receiving portion of generally U-shape in cross section so that it has a vertically disposed inner wall, a vertically disposed outer wall and a generally horizontally disposed bottom wall, said inner article-supporting portion being mounted upon the upper end of the inner wall of said crumb-receiving portion and said outer cover-supporting portion being mounted upon the upper end of the outer wall of said crumb-receiving portion, said inner article-supporting portion being thereby surrounded by said crumb-receiving portion and said crumb-receiving portion being thereby surrounded by said outer cover-supporting portion, the upper end of said cover supporting-portion terminating, however, below the general plane of the top surface of said article-supporting portion, whereby a knife or the like may be passed horizontally inwardly along said surface without engaging said outer cover-supporting portion.

In testimony whereof I hereby affix my signature.

FREDERICK F. PFEFFERKORN.